(12) United States Patent
Hunter et al.

(10) Patent No.: US 7,432,630 B2
(45) Date of Patent: Oct. 7, 2008

(54) HIGH POWER-TO-MASS RATIO ACTUATOR

(75) Inventors: Ian Hunter, Lincoln, MA (US); John D. Madden, Vancouver (CA)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/781,526

(22) Filed: Jul. 23, 2007

(65) Prior Publication Data

US 2007/0262677 A1 Nov. 15, 2007

Related U.S. Application Data

(62) Division of application No. 10/172,810, filed on Jun. 13, 2002, now Pat. No. 7,256,529.

(60) Provisional application No. 60/297,898, filed on Jun. 13, 2001.

(51) Int. Cl.
*H01L 41/08* (2006.01)

(52) U.S. Cl. .................. 310/317; 310/300; 310/363

(58) Field of Classification Search ................. 310/300, 310/317, 363
See application file for complete search history.

(56) References Cited

U.S. PATENT DOCUMENTS

| | | | | |
|---|---|---|---|---|
| 4,096,047 | A | 6/1978 | Hale et al. | 204/415 |
| 6,428,684 | B1 | 8/2002 | Warburton | 205/775 |
| 6,555,945 | B1 | 4/2003 | Baughman et al. | 310/300 |
| 6,586,859 | B2 * | 7/2003 | Kornbluh et al. | 310/309 |
| 6,770,027 | B2 * | 8/2004 | Banik et al. | 600/146 |
| 6,969,365 | B2 * | 11/2005 | Scorvo | 602/16 |
| 7,063,671 | B2 * | 6/2006 | Couvillon, Jr. | 600/562 |
| 7,256,529 | B2 | 8/2007 | Hunter et al. | 310/300 |
| 2003/0236531 | A1 * | 12/2003 | Couvillon, Jr. | 606/113 |
| 2004/0068224 | A1 * | 4/2004 | Couvillon et al. | 604/67 |
| 2006/0253942 | A1 * | 11/2006 | Barrera et al. | 977/852 |

OTHER PUBLICATIONS

Madden et al., Fast contracting polypyrrole actuators, Synthetic Metals 113, Issue 1-2, Jun. 15, 2000, pp. 185-192.

Braghman, Conducting polymer artificial muscles, Synthetic Metals 78 (1996) pp. 339-353.

Mazzoldi et al., Conducting Polymer Actuators, Springer Verlag: Heidelberg, 1999.

Baughman et al., Electromechanical Actuators Based on Conducting Polymers, Topics in Molecular Organization and Engineering, vol. 7: Molecular Electronics; 1991, p. 267.

(Continued)

*Primary Examiner*—Thomas M Dougherty
(74) *Attorney, Agent, or Firm*—Bromberg & Sunstein LLP (57) ABSTRACT

A method for driving an actuator. The method includes applying an electrical potential across an electrostrictive material relative to a counterelectrode disposed within an electrolyte, thereby creating a double layer potential across a region of enhanced ionic concentration. A current flowing between the electorostrictive material and the counterelectrode is measured. A portion of the applied potential appearing across the electrolyte and counterelectrode is calculated and subtracted from the applied potential to obtain an estimated double layer potential. The applied electrical potential is adjusted to obtain a specified double layer potential.

20 Claims, 12 Drawing Sheets

OTHER PUBLICATIONS

Pei et al., Electrochemica Applications of the Bending Beam Method, Journal of Physical Chemistry 1992, 96, pp. 10507-10514.

Herod et al., Doping-Induced Strain in Polyaniline: Stretchoelectrochemistry, Chemistry of Materials, 1993, 5, pp. 951-955.

Kaneko et al., Electrolyte and strain dependences of chemomechanical deformation of polyaniline film, Synthetic Metals 84 (1997) pp. 795-796.

Otero, T.F., Artificial Muscles, Electrodissolution and Redox Processes in Conducting Polymers, Handbook of Organic Conductive Molecules and Polymers: vol. 4, Conductive Polymers: Transport, Photophysics and Applications, 1997; vol. 4, pp. 517-594.

Della Santa et al., Bilayer muscles, Synthetic Metals 1997, 90, pp. 93-100.

Madden et al., Accession No. AD-A332 030/6/XAB; Progress Towards An Automatic, Microfabricated Polymer Air-Fluid Sampling Inlet NTIS: 1997.

Madden et al., Encapsulated Polypyrrole Actuators, Synthetic Metals 105 (1999) pp. 61-64.

Pei et al., Electrochemical applications of the banding beam method; a novel way to study ion transport in electroactive polymers, Solid State Ionics 1993, 60, pp. 161-166.

Lee et al., Thin Film Conductive Polymer for Microactuator and Micromuscle Applications, Dynamic Systems and Control; ASME: 1994; Vo. 55-2, pp. 735-732.

Mazzoldi et al., Actuative properties of polyaniline fibers under electrochemical stimulation, Materials Science & Engineering C 6 (1998) pp. 65-72.

Hunter et al., A Comparison of Muscle with Artificial Actuators, Synthetic Metals, Technical Digest IEEE Solid State Sensors and Actuators Workshop; IEEE: 1992; pp. 178-185.

Kaneto et al., Artificial muscle: Electromechanical actuators using polyaniline films, Synthetic Metals 1995, 71 pp. 2211-2212.

Madden et al., Fabrication by Electrodeposition: Building 3D Structures and Polymer Actuators, Proceedings—Micro Machine and Human Science 95; 1995, pp. 1-5.

Smela et al., Controlled Folding of Micrometer-Size Structures, Science, 1995, vol. 268, pp. 1735-1738.

Yamaura et al., Memory effect of electrical conductivity upon the counteranion exchange of polypyrrole films, Synthetic Metals 1992, vol. 48, pp. 337-354.

Smela et al., Electrochemical Muscles: Micromachining Fingers and Corkscrews, Advanced Materials 1993, 5 (9) pp. 630-632.

Sapp et al., Rapid Switching Solid State Electrochromic Devices Based on Complementary Conducting Polymer Films, Advanced Materials 1996, 8, pp. 808-811.

Courtot-Coupez et al., Electrochimie dan le carbonate de propylene, Bulletin De La Societe Chimique De France 1970, 4, pp. 1631-1636.

Arbizzani et al., Conducting Polymers for Batteries, Supercapacitors and Optical Devices, Handbook of Organic Conductive Molecules and Polymers: vol. 4, 1997, vol. 4, Chapter 11, pp. 595-619.

* cited by examiner

HIGH POWER-TO-MASS RATIO ACTUATOR

CROSS REFERENCE TO RELATED APPLICATIONS

This application is a divisional patent application of U.S. patent application Ser. No. 10/172,810 filed Jun. 13, 2002 entitled "High Power-to-Mass Ratio Actuator," which in turn claims priority from U.S. provisional patent application Ser. No. 60/297,898 filed Jun. 13, 2001 entitled "High Power-to-Mass Ratio Actuator." Each of the above-described applications is hereby incorporated by reference, in its entirety.

TECHNICAL FIELD AND BACKGROUND ART

The present invention pertains to systems and methods for activating contractile actuators based on ion migration, and, more particularly, to methods for achieved increased activation rate without significant degradation of actuator lifetimes.

Polypyrrole, polyaniline, polyacetylene and other conducting polymers undergo volumetric changes that may be exploited to perform work, as described by R. H. Baughman, *Synthetic Metals* 1996, 78(3), 339-353 and A. Mazzoldi, A. Della Santa, D. De Rossi, *Polymer Sensors and Actuators, Springer Verlag: Heidelberg,* 1999, each of which are hereby incorporated by reference, in their entirety. Polymer expansion is generally the result of ionic and molecular influxes that occur as oxidation state is altered either chemically or electrochemically, as described by R. H. Baughman, R. L. Shacklette, R. L. Elsenbaumer, *Topics in Molecular Organization and Engineering, Vol. 7:* Molecular Electronics, Kluwer: Dordrecht, 1991, p 267; Q. Pei, O. Inganas, *Journal of Physical Chemistry,* 1992, 96(25), 10507-10514; T. E. Herod, J. B. Schlenoff, *Chemistry of Materials* 1993, 5, 951-955; M. Kaneko, M. Fukui, W. Takashima, K. Kaneto, *Synthetic Metals* 1997, 84, 795-796; and T. F. Otero, *Handbook of Organic and Conductive Molecules and Polymers,* John Wiley & Sons: Chichester, 1997; Vol. 4, pp 517-594, each of which are hereby incorporated by reference, in their entirety. Electrochemical experiments show that strain is proportional to the magnitude of charge transfer and, equivalently, that strain rate is proportional to current.

Strains for non-gels are commonly in the range of one to three percent at applied stresses of up to 5 MPa, but can exceed 10% in chemically doped material. Mammalian skeletal muscle, by comparison, deforms by 20% in vivo with stresses of 0.35 MPa. The integral of stress with respect to strain over a cycle is the work density. Conducting polymers currently match muscle in this figure of merit, but are three orders of magnitude slower and, as a consequence, are much less powerful for a given volume or mass. Strain rates reported to date reach $0.1\% \cdot s^{-1}$ with associated power to mass ratios of $<1$ $W \cdot kg^{-1}$. Faster responses are likely achieved in a number of bilayer actuators, as described by K. Kaneto, M. Kaneko, Y. Min, A. G. MacDiarmid, *Synthetic Metals* 1995, 71, 2211-2212, which is hereby incorporated by reference, in its entirety, but their intrinsic characteristics are not reported, as described by J. D. Madden, S. R. Lafontaine, I. Hunter, I. W. *Proceedings—Micro Machine and Human Science* 95; 1995, which is hereby incorporated by reference, in its entirety. Bilayers are laminates of conducting polymer and other thin films, in which the relative expansion or contraction of the polymer with respect to the other layers leads to a bending of the structure, with small material strains being amplified to create large deflections. Using the bilayer deflection data reported by E. Smela, O. Inganas, I. Lundstrom, *Science* 1995, 268, 1735-1738, which is hereby incorporated by reference, in its entirety, the tensile modulus polypyrrole grown using their methods, and the standard relationship between deflection and strain, we calculate that the 400 nm thick polypyrrole/gold bilayers Smela et. al. employ achieve strain rates of 1% $s^{-1}$ (still roughly 100 times slower than mammalian skeletal muscle).

SUMMARY OF THE INVENTION

In accordance with one embodiment of the present invention, a method is presented for driving an actuator, where the actuator is characterized by a strain state. The method includes applying an electrical potential across an electrostrictive material relative to a counterelectrode disposed within an electrolyte, thereby creating a double layer potential across a boundary region of enhanced ionic concentration. A current flowing between the electorostrictive material and the counterelectrode is measured. A portion of the applied potential appearing across the electrolyte and counterelectrode is calculated, and subtracted from the applied potential to obtain an estimated double layer potential. The applied electrical potential is adjusted to obtain a specified double layer potential.

In accordance with related embodiments of the invention, the above described steps may be repeated until a specified strain state of the actuator is achieved. The electrical potential may be adjusted such that the specified double layer potential does not exceed a specified limiting potential. Applying the electrical potential may include applying an electrical voltage greater than the specified limiting double layer potential. Additionally, the step of calculating a portion of the applied potential appearing across the electrolyte and counterelectrode may include multiplying the current by a substantially constant solution resistance. The electrostrictive material may include polypyrrole or carbon nanotubes.

In accordance with another embodiment of the invention, a method for driving an actuator is presented. The actuator includes an electrostrictive material disposed adjacent an electrolyte, the electrostrictive material characterized by a limiting double layer potential. The method includes applying an electrical potential, which is greater than the limiting double layer potential, across the electrostrictive material and electrolyte relative to a counterelectrode. This results in a double layer potential and a current flowing between the electrostrictive material and the counterelectrode. The electrical potential is varied based at least on preventing the double layer potential from exceeding the limiting double layer potential.

In accordance with related embodiments of the invention, the step of varying the electrical potential may include cycling the electrical potential at a predetermined frequency. The step of varying the electrical potential may include reducing the electrical potential below the limiting double layer potential. The electrostrictive material may include polypyrrole and/or carbon nanotubes.

In accordance with further related embodiment of the invention, varying the electrical potential may include measuring the current. A portion of the electrical potential appearing across the electrolyte and counterelectrode is calculated and subtracted from the electrical potential appearing across the electrolyte and counterelectrode from the electrical potential to obtain an estimated double layer potential. The applied electrical potential is adjusted so as to ensure the estimated double layer potential does not exceed the limiting double layer potential.

In accordance with yet another related embodiment, varying the electrical potential includes positioning a reference electrode within the electrolyte, and calculating the double layer potential based at least in part on voltage measured across the reference electrode and the electrostrictive material.

In still yet another related embodiment of the invention, varying the electrical potential includes positioning a reference electrode within the electrolyte. A potentiostat circuit is used to set a second electrical potential between the electrostrictive material and the reference electrode. A resistance is derived between the reference electrode and the electrostrictive material and an estimated double layer potential is calculated. Calculating the double layer potential includes measuring a current through the electrostrictive material and electrolyte and subtracting a product of the current and the resistance from the applied second electrical potential. The resistance may be derived by measuring an initial current through the electrolyte and electrostrictive material upon a step change in the electrical potential, and dividing the second electrical potential by the initial current to calculate the resistance.

In accordance with another embodiment of the invention, an actuator device includes an electrolyte. An electrostrictive material is disposed adjacent to the electrolyte, and a counterelectrode is electrically coupled to the electrolyte and electrorestrictive material. A controller applies an electrical potential across the electrostrictive material and the electrolyte relative to the counterelectrode, thereby resulting in a double layer potential and a current flowing between the electrostrictive material and the counterelectrode. The controller varies the electrical potential so as to regulate the double layer potential.

In accordance with related embodiments of the invention, the controller may vary the electrical potential such that the double layer potential does not exceed a specified limiting double layer potential. In other embodiments, the controller may vary the electrical potential so that it is greater than the specified limiting double layer potential, or so as to obtain a specific double layer potential.

In accordance with further related embodiments, the controller includes a current measuring device for measuring the current, whereby the controller calculates a portion of the electrical potential appearing across the electrolyte and counterelectrode, and subtracts the portion of the applied potential to obtain an estimated double layer potential. The controller may include a multiplier for multiplying the current by a substantially constant electrolyte resistance to obtain the portion of the electrical potential appearing across the electrolyte. The electrostrictive material may includes polypyrrole or carbon nanotubes.

In yet further related embodiments of the invention, the electrostrictive material may be coupled to a second material to form a bilayered actuator. The second material may be platinum and/or serve as the counterelectrode. The electrolyte may be a gel.

In accordance with another embodiment of the invention, an actuator device includes a first electrode disposed adjacent to a first layer of electrostrictive material. An electrolyte is disposed adjacent to the first layer. A second electrode is disposed adjacent to a second layer of electrostrictive material, with the second layer further disposed adjacent the electrolyte. A controller applies an electric potential across the first electrode and the second electrode, thereby resulting in a first double layer potential between the first layer and the electrolyte and a second double layer potential between the second layer and the electrolyte, wherein the controller varies the electric potential so as to regulate the first double layer potential and the second double layer potential.

In accordance with related embodiments of the invention, the controller may vary the electrical potential such that the first double layer potential and the second double layer potential do not exceed a specified limiting double layer potential. In various embodiments, the controller may vary the electrical potential such that the electric potential is greater than the specified limiting double layer potential. The electrostrictive material may be a gel and/or include polypyrrole or carbon nanotubes.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

A system and method for activating contractile actuators based on ion migration, so as to achieve increased activation rate without significant degradation of actuator lifetimes, is presented. An increased activation rate will result in correspondingly greater opportunities for the application of contractile actuators to robotics, prosthetics and microelectromechanical systems, among others. An "activation rate" refers to the rate of electromechanical charging of the actuator, which is proportional to strain rate of the actuator and/or rate of change of force provided by the actuator. The "strain rate" is the fractional change in linear dimension per unit time.

With regards to an actuator that includes an electrolyte and an electrostrictive material, applied potential across the actuator influences the actuator's strain rate. Otero demonstrates that increasing the magnitude of the applied potential increases strain rate. Unfortunately, this increase also leads to degradation of the electrostrictive material. It is generally believed that the relatively large currents generated at high applied potentials induce large ohmic drops across the electrolyte and the electrostrictive material, which initially dominate the total voltage drop, as described by J. D. Madden, C. J. Brenan, J. Dubow, *Accession Number AD-A332 030/6/XAB; Progress Towards An Automatic, Microfabricated Polymer Air-Fluid Sampling Inlet* NTIS: Springfield, Va., 1997, which is hereby incorporated by reference, in its entirety. Eventually, as the current through the actuator decreases due to the slowing of diffusion of ions between the electrolyte and the electrostrictive material, a double layer potential that develops at the boundary of the electrolyte and electrostrictive material increases. This is believed to make parasitic electrochemical reactions more favorable, causing the electrostrictive material to degrade.

Degradation is minimal in the electrorestrictive material when the electrochemical potential is maintained within a limited potential range. Another way of avoiding degradation, so as to achieve high strain rates, for example, is to apply high potentials over short periods, as described by Madden et al. (1997). In order to avoid degradation of the electrostrictive material in accordance with preferred embodiments of the invention, generation of double layer potentials that exceeds these limits is avoided. This is further described by J. Madden et al., *Fast Contracting Polypyrrole Actuators*, Synthetic Metals 113 (1-2), 185-192, Jun. 15, 2000, which is herein incorporated by reference, in its entirety.

Figure 1:
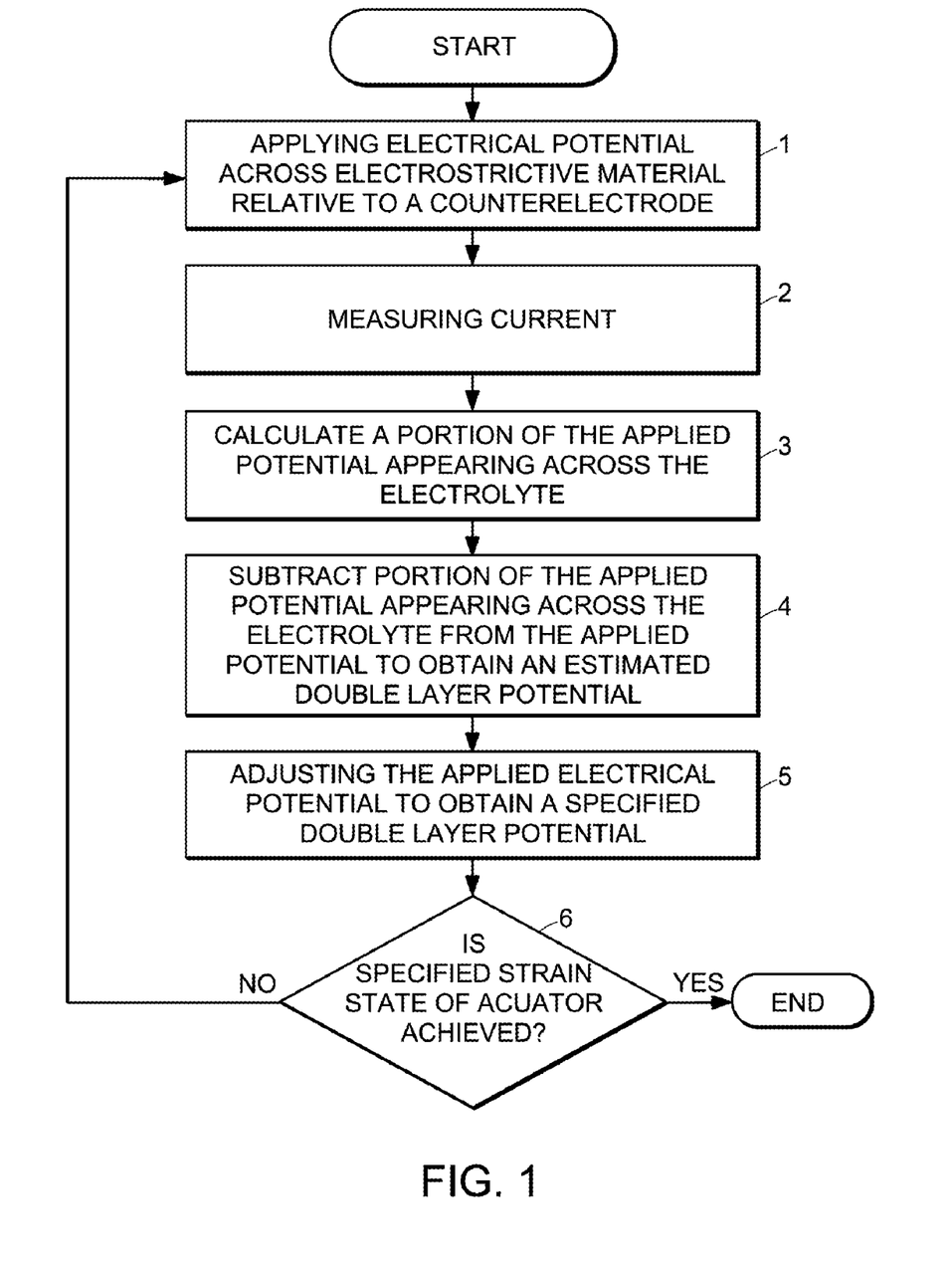
FIG. 1 is a flow diagram for driving an actuator based on ion migration, in accordance with one embodiment of the invention.

FIG. 1 shows a flow diagram for a method of driving an actuator, in accordance with one embodiment of the invention, where the actuator is characterized by a strain state. The actuator, in typical embodiments, is described in more detail below with reference to FIGS. 2-4 and 11. The method includes applying an electrical potential across an electrostrictive material relative to a counterelectrode disposed within an electrolyte, thereby creating a double layer potential across a region of enhanced ionic concentration, step 1.

Figure 11:
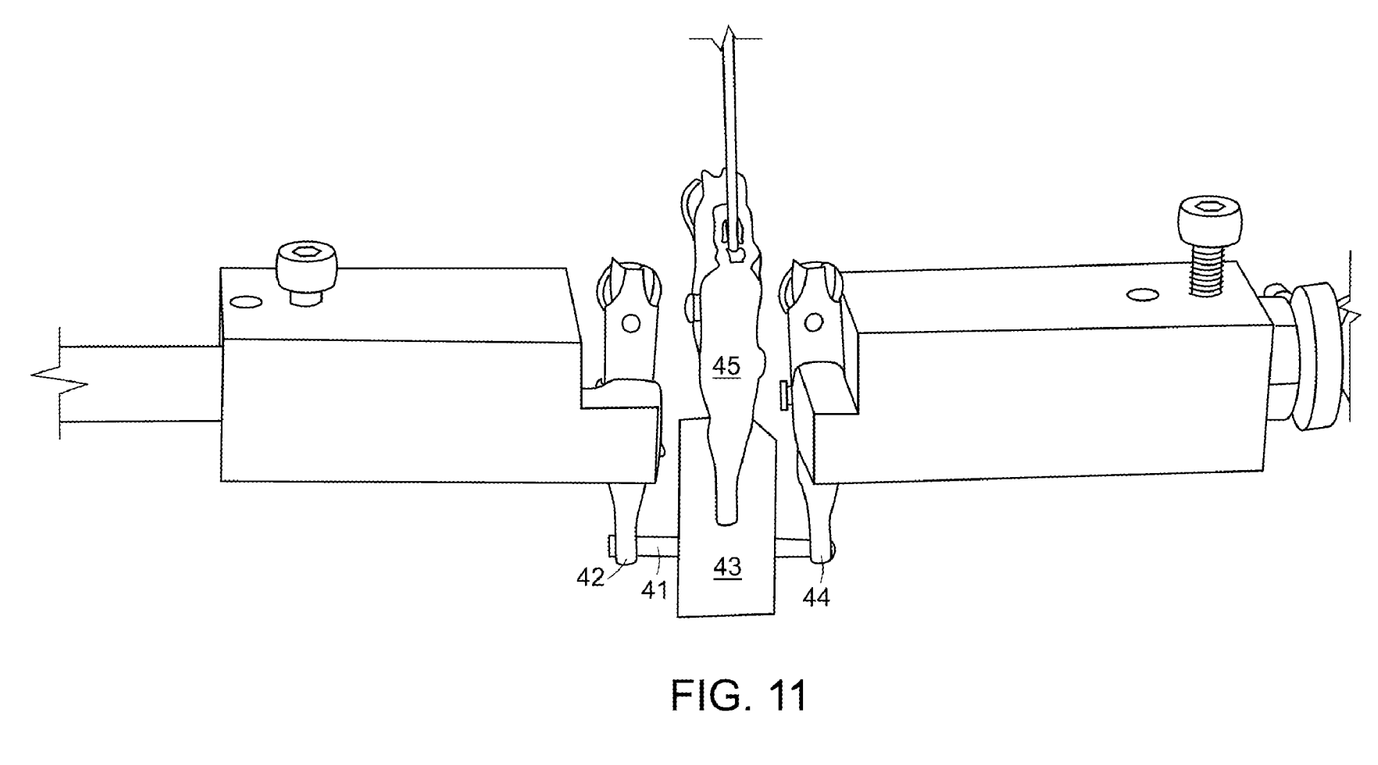
FIG. 11 shows a carbon nanotube actuator in accordance with one embodiment of the invention.

Electrostrictive materials may include, without limitation, carbon nanotubes, or conducting polymers such as polypyrrole, polyaniline, and polyacetylene. Carbon nanotubes are nanometer diameter electrically conductive tubes. Immersion of tubes into an electrolyte, and the application of a potential, produces double layer charging. The nanotubes may be prepared as papers or fibers. When immersed in solution, electrolyte wets individual nanotubes or bundles of nanotubes. The papers and fibers have enormous internal surface area, and thus huge capacitance. The charging process also has been shown to create displacement, and thus actuation. As in conducting polymer actuators, the displacement produced is a function of charge transferred. One of the rate limiting factors is the series resistance of the electrolyte, and of any contacts. As in polypyrrole and other conducting polymers, faster charging is achieved by applying shaped potentials. Once again the key is to avoid applying excessive potentials to the material itself. By identifying the magnitude of series resistances, the application of excessive potentials can be avoided, while nevertheless maximizing rate. An illustration of a carbon nanotube actuator 41 being held by alligator clips 42 and 44, prior to being inserted in an aqueous solution and tested, is shown in FIG. 11. A counter electrode 43 is shown being held by another alligator clip 45.

An electrostrictive actuator may operate, for example, in air, or in aqueous or other liquid or gel environments. The electrostrictive actuator may be, without limitation, a bilayer or a linear contracting film.

Figure 2A:
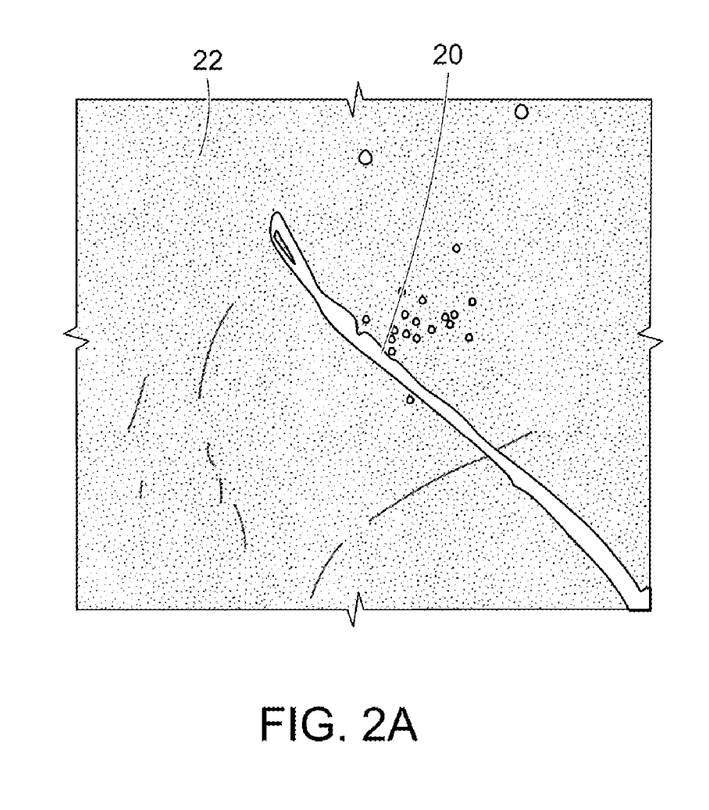
FIG. 2(a) is an illustration of a bilayer actuator in aqueous solution at the limits of deflection during the application of ±7 V amplitude square waves at 1 Hz, in accordance with one embodiment of the invention.
Figure 2B:
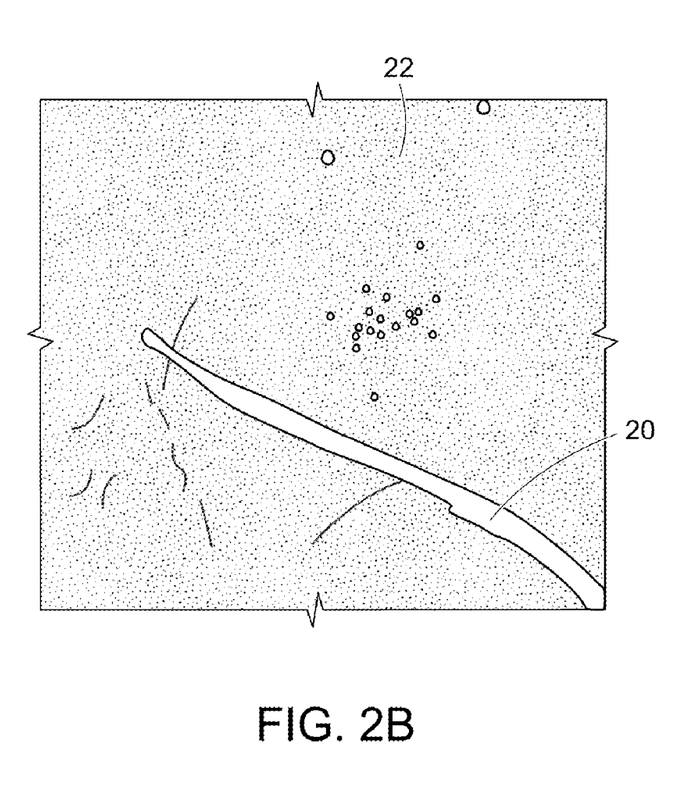
FIG. 2(b) is an illustration of a bilayer actuator in aqueous solution at the limits of deflection during the application of ±7 volt amplitude square waves at 1 Hertz, in accordance with one embodiment of the invention.
Figure 3:
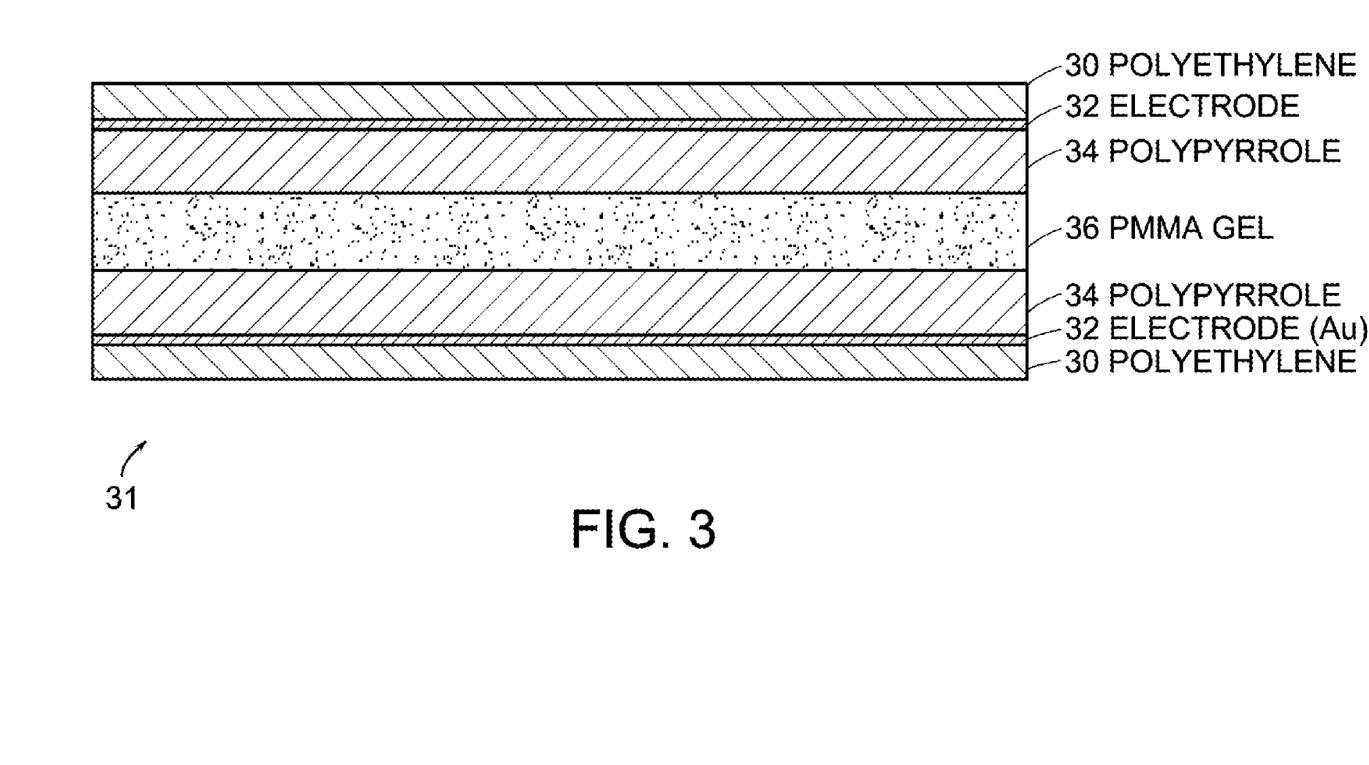
FIG. 3 is a cross-section of an encapsulated bilayer actuator, in accordance with one embodiment of the invention.
Figure 8A:
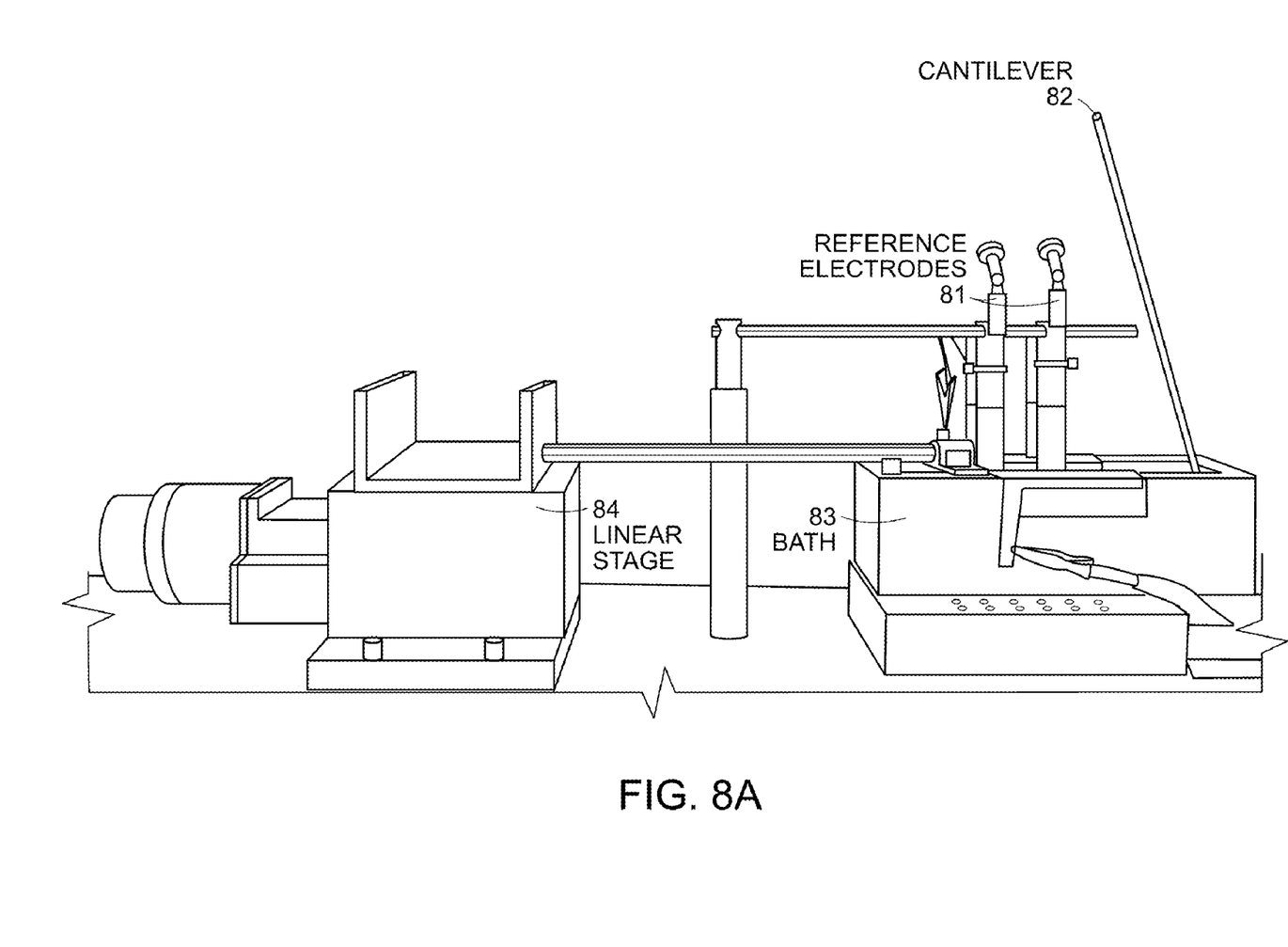
FIG. 8(a) is an illustration of a linear actuator apparatus.
Figure 8B:
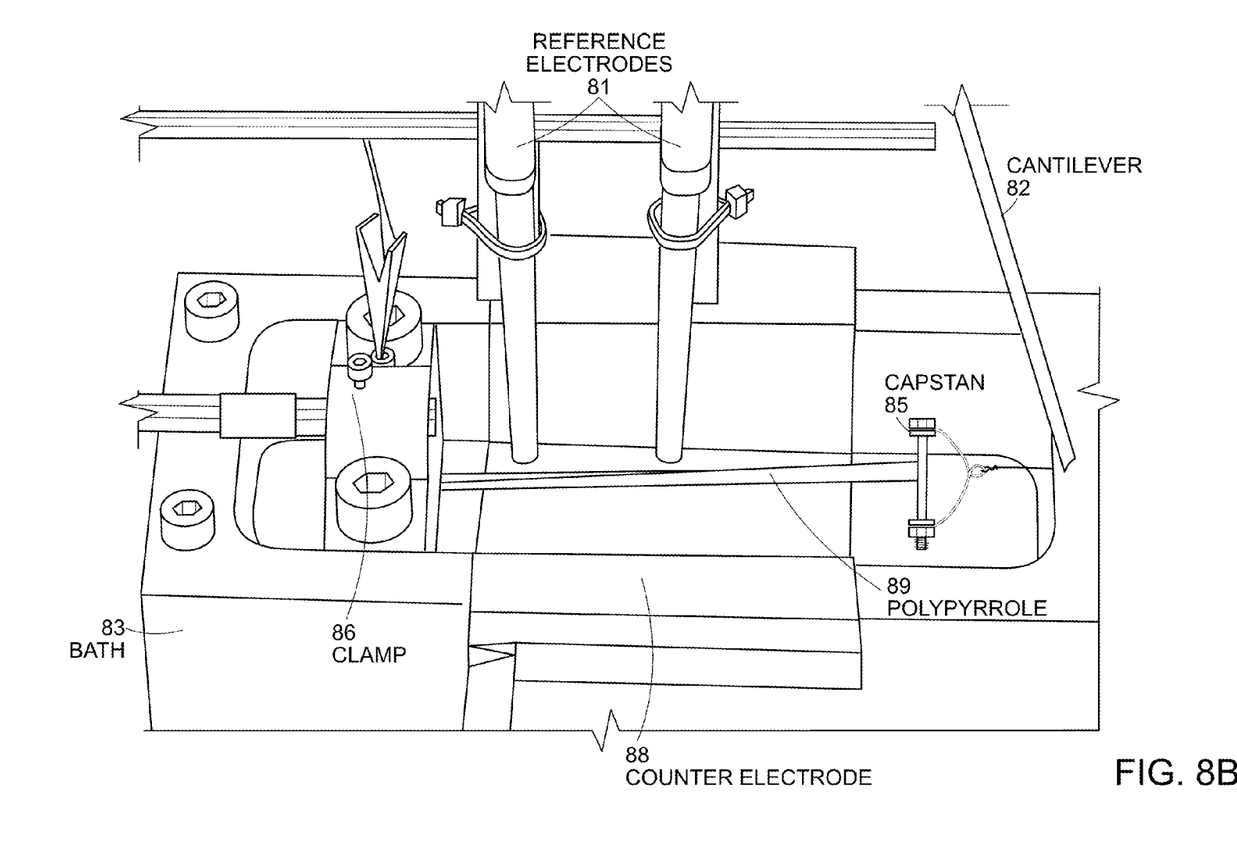
FIG. 8(b) is an illustration of the bath interior of the linear actuator apparatus shown in FIG. 8(a)

FIGS. 2(*a*) and 2(*b*) show an example of a bilayer actuator 20, operated in an aqueous environment 22 that includes a strip of polypyrrole grown on a thin layer of platinum, in accordance with one embodiment of the invention. The platinum acts as the mechanically passive member of the bilayer and as the working electrode. In another embodiment of the invention, FIG. 3 shows a configuration of a bilayer actuator 31 operated in air. Here, a thin layer of gel electrolyte 36 separates two polypyrrole strips 34, with each strip 34 further coupled to an electrode 32. Upon activation one polymer layer expands, while the other polymer layer contracts. A third actuator is shown in FIGS. 8(*a*) and 8(*b*) in accordance with yet another embodiment of the invention, and includes a freestanding polypyrrole film 89 immersed in electrolyte. Passage of current between the film 89 and a counter electrode 88 leads to a generation of force, causing the movement of a cantilever 82.

Referring back to FIG. 1, a current flowing between the electorostrictive material and the counterelectrode is measured, step 2. A portion of the applied potential appearing across the electrolyte and counterelectrode is calculated, step 3. In various embodiments, calculating a portion of the applied potential appearing across the electrolyte and counterelectrode may include multiplying the current by a substantially constant solution resistance. In various embodiments, electrolyte resistance may be first estimated by dividing the applied voltage by current drawn immediately after the application of an applied potential step.

The portion of the applied potential appearing across the electrolyte and counterelectrode is then subtracted from the applied potential to obtain an estimated double layer potential, step 4. The applied electrical potential is adjusted to obtain a specified double layer potential, step 5.

The above-described steps 1-5 may be repeated until a specified strain state of the actuator is achieved, step 6. To prevent degradation, the electrical potential may be adjusted such that the specified double layer potential does not exceed a specified limiting double layer potential, which is typically chosen to be in a range at which degradation is minimal. In various embodiments, an electrical potential may be applied that is greater than the specified limiting double layer potential, thus achieving a higher strain rate, for example. Degradation of the actuator is reduced as long as the specified limiting double layer potential is not exceeded. In accordance with various embodiments of the invention, the applied potential may be a shaped potential that is initially large in magnitude, but which subsequently tapers off as cell current and ohmic drop diminish. The shaped charge may be cyclic and/or have a predetermined frequency.

Figure 5:
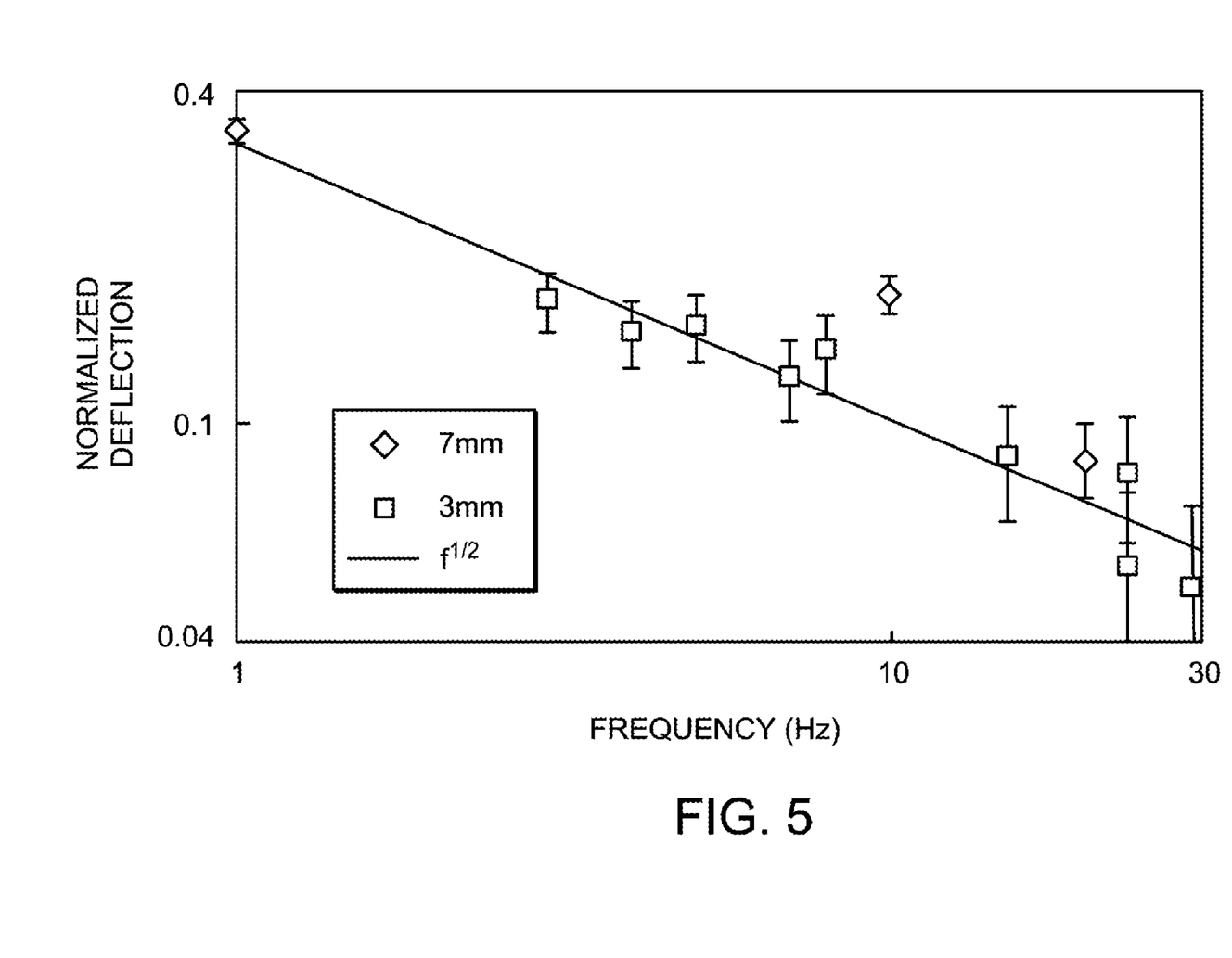
FIG. 5 is a plot showing the deflection of the aqueous-based bilayers as a function of frequency, in accordance with one embodiment of the invention.

In accordance with one embodiment of the invention, FIGS. 2(a) and 2(b) are illustrations of an example of a bilayer actuator in aqueous solution at the limits of deflection during the application of ±7 V amplitude square waves at 1 Hz. The deflection of the aqueous-based bilayers is shown as a function of frequency in FIG. 5. Deflection is scaled by the beam length as an aid to visualizing the extent of bending. The error bars shown account for uncertainties in the measurement of deflection, which are larger for the shorter beam due to its smaller motions. From this data, it is possible to get a crude lower bound estimate of strain and strain rate. Strain reaches at least 0.4% at 1 Hz, while average strain rates over a cycle, are greater than $3\% \cdot s^{-1}$ at 10 Hz.

Figure 4A:
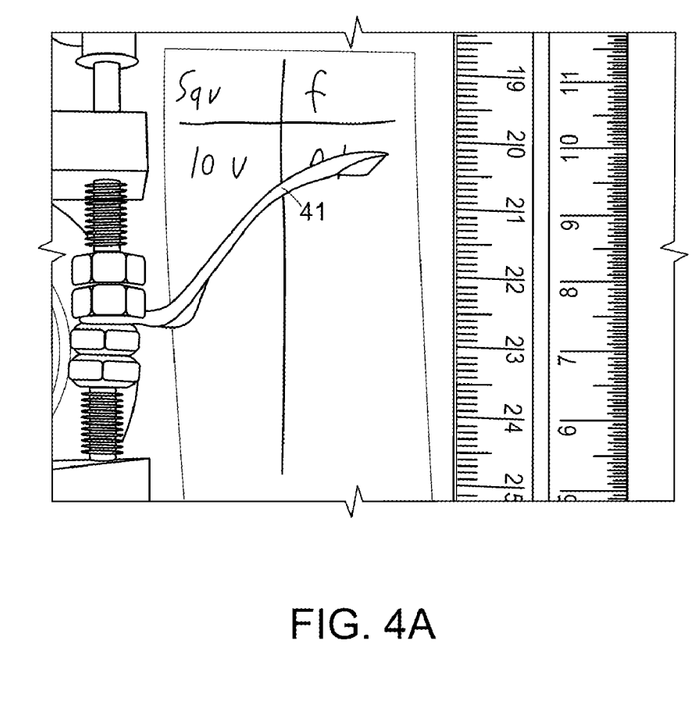
FIG. 4(a) is an illustration showing the extent of deflection of an encapsulated bilayer upon activation with a ±5 volt square wave at 0.1 Hertz, in accordance with one embodiment of the invention.
Figure 4B:
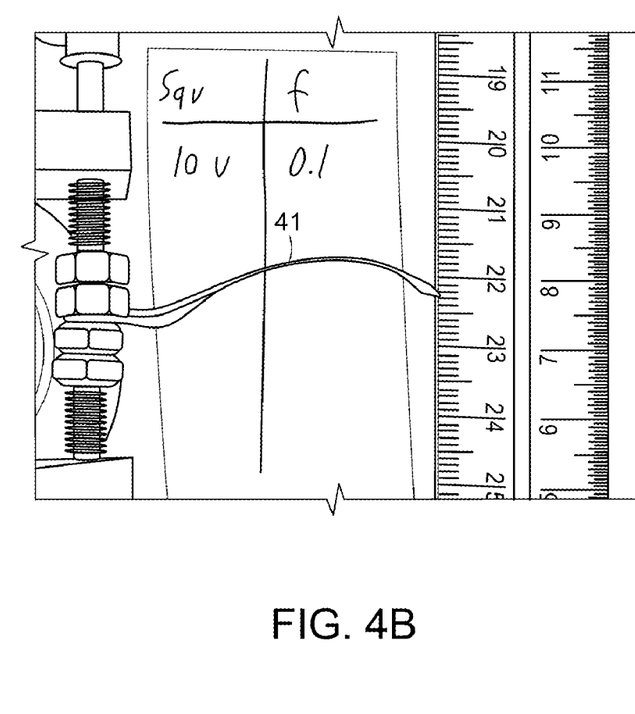
FIG. 4(b) is an illustration showing the extent of deflection of an encapsulated bilayer upon activation with a ±5 volt square wave at 0.1 Hertz, in accordance with one embodiment of the invention.

In accordance with another embodiment of the invention, FIGS. 4(a) and 4(b) are illustrations showing the extent of deflection of an example of an encapsulated bilayer actuator 41 in air upon activation with a ±5 volt square wave at 0.1 Hertz. The air-operated bilayer in this embodiment, is similar to the actuator shown in FIG. 3, which includes two polypyrrole strips 34 cut from tetraethylammonium hexafluorophosphate doped films. A sandwich structure is formed, with the polypyrrole strips 34 forming outer layers, and containing a gel electrolyte 36 between them. A gold layer 32 is sputtered onto the outer polymer surfaces, and the entire actuator is encapsulated in a polyethylene film 30. The gel 36 may be synthesized, for example, following a procedure described by S. A. Sapp, G. A. Sotzing, J. L. Reddinger, J. R. Reynolds, *Advanced Materials* 1996, 8, 808, which is herein incorporated by reference, in its entirety. The actuators may be soaked for 15 minutes in a solution of 0.05 M tetraethylammonium hexafluorophosphate in propylene carbonate, which renders the polymer 34 more compliant.

Figure 6:
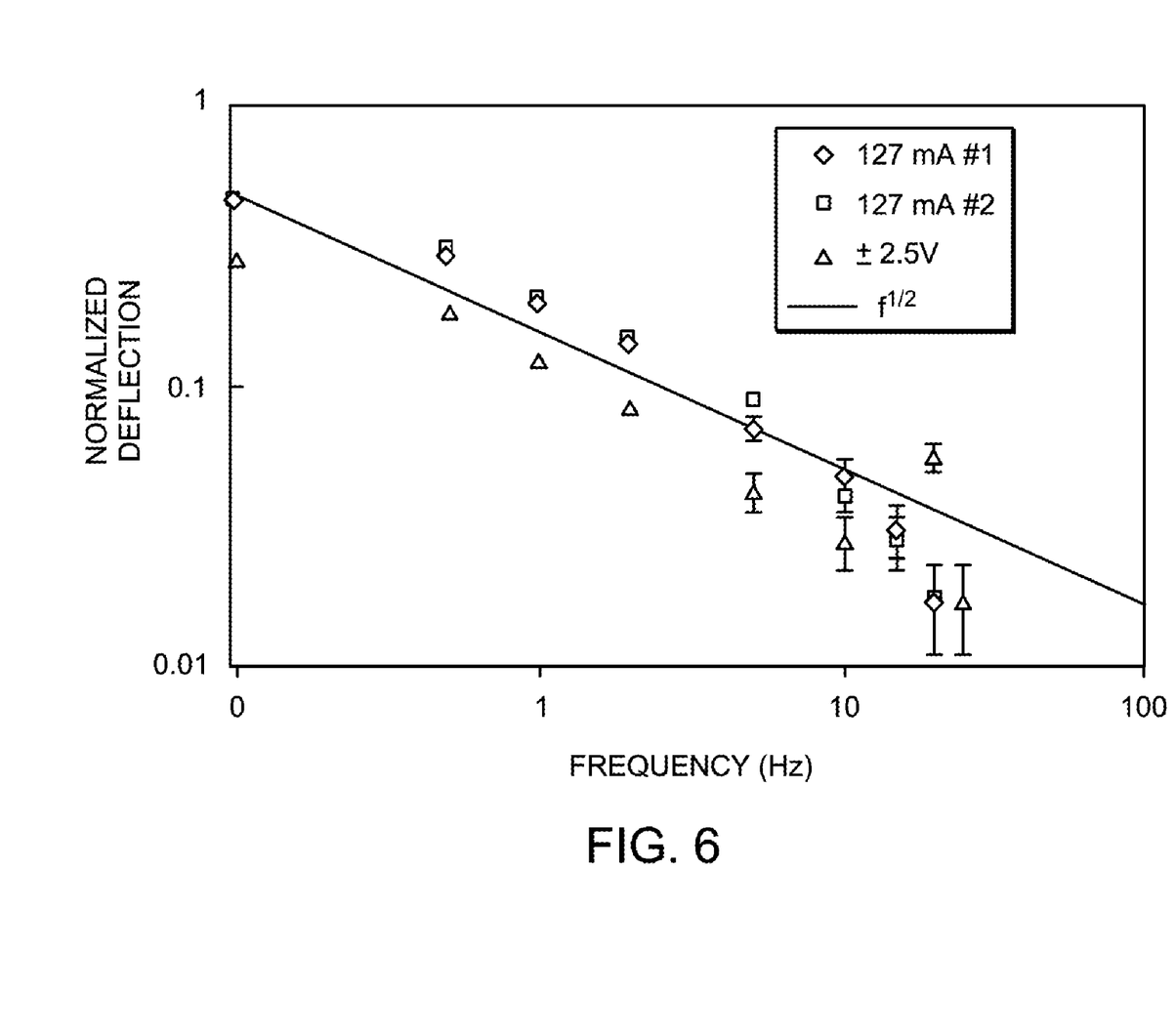
FIG. 6 is a plot showing the mechanical frequency response of an encapsulated conducting polymer to current, in accordance with one embodiment of the invention.

FIG. 6 is a plot of the square wave frequency response of a sample air bilayer, in accordance with one embodiment of the invention. The error bars once again represent uncertainties in the measurement of deflection. Deflection is normalized to actuator length. Results from square wave amplitudes of ±2.5 V, ±5 V and ±10 V are shown. The power supply saturated at ±5 V and ±10 V, instead producing a nearly constant current of ±127 mA. Again, it is possible to generate a lower bound strain estimate, based on the minimum actuator thickness, the polypyrrole glassy modulus and the total deflection. The strain at 0.1 Hz is >0.2%, and the limiting strain rate, occurring at 15 Hz, is >0.5% $s^{-1}$.

There are several factors that may limit strain rate. These include reaction kinetics, the rate of capacitive charging of the double layer, the mechanical impedance, and mass transport. The strain rates in FIGS. 5 and 6 appear to follow a square root power law with frequency between 0.5 Hz and 20 Hz, suggesting that semi-infinite planar diffusion may be involved. Hence, diffusion of molecules into or out of the polymer limits the rate of bending, and the ionic and molecular flows occur primarily near the electrolyte/polymer interface, and not deep into the polymer.

Figure 7:
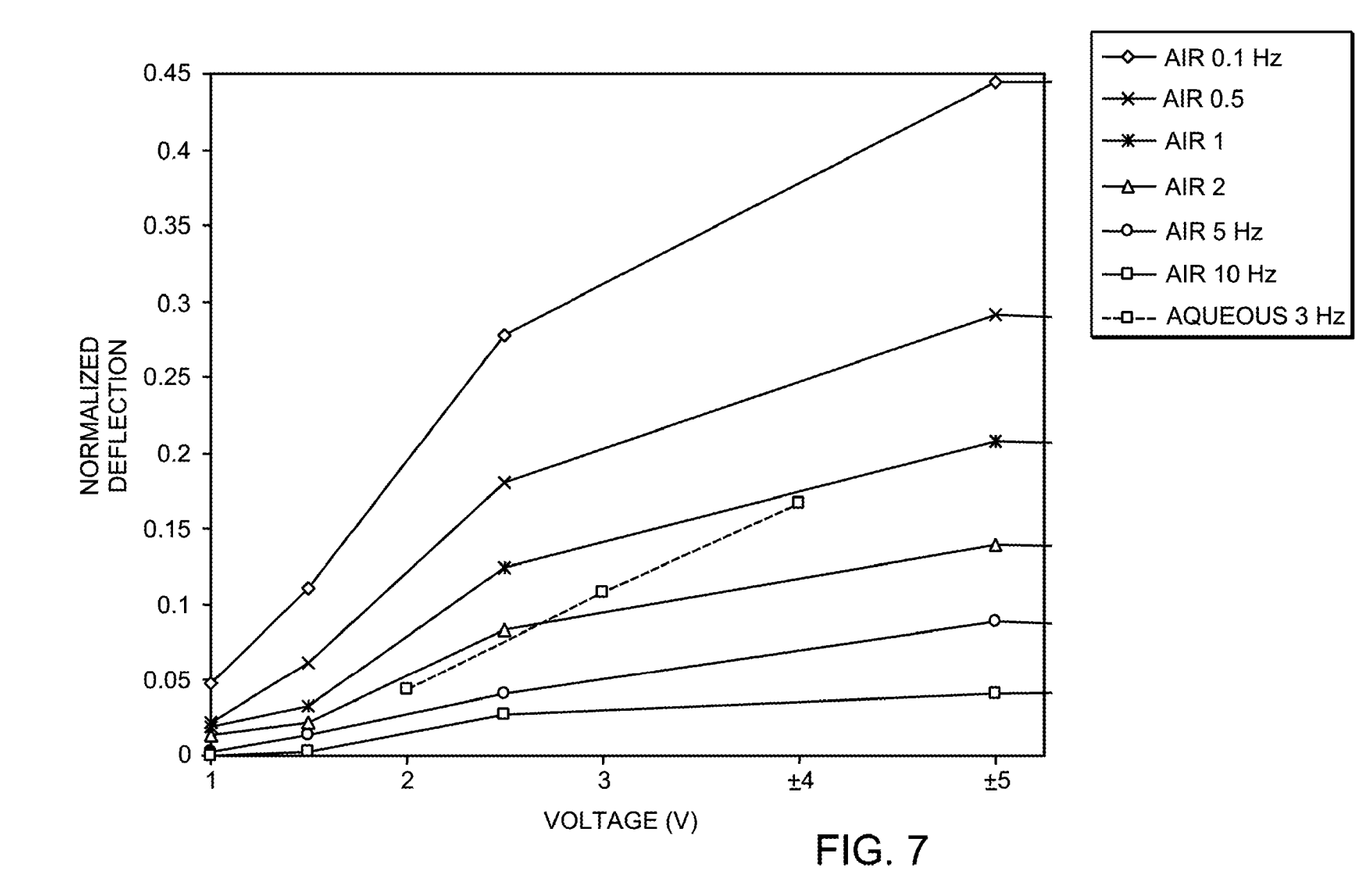
FIG. 7 is a plot of deflection as a function of voltage at various square wave activation frequencies for the encapsulated and aqueous-based bilayers.

The magnitude of deflection is a function of applied potential, as seen in FIG. 7, where data from the deflection of air bilayers, and the 3 mm aqueous-based bilayer at 3 Hz, are shown. Lines between points are intended to help distinguish the various bilayer data sets, and do not represent a model. The 3 Hz aqueous data shows a linear trend with increasing applied potential, while for the air bilayers, response initially increases, but begins to saturate beyond ±2.5 V, and levels off between ±5 V and ±10 V. This is due to the power supply, which reached its maximum current output of 127 mA at a command potential of ±5V.

Aqueous bilayer cycle life is typically frequency dependent. At frequencies below 1 Hz, delamination may occur after several cycles as gas forms at the platinum/polymer interface. However, at higher frequencies, much longer lifetimes are possible. An actuator was left running for 120,000 cycles at 3 Hz, producing strains of >0.25% at a strain rate of at least 1.5% $s^{-1}$. No deterioration in amplitude was observed. The lifetime of the air bilayers tested lasted only several hours. Evaporation of liquid solvent from the gel and the polypyrrole appears to degrade performance, which is then recovered by immersion in a liquid bath. Hence, encapsulation may be advantageously employed to improve life of the actuator.

In accordance with another embodiment of the invention, FIGS. 8(a) and 8(b) show an example of a linear actuator. A polypyrrole film 89 is attached to a cantilever 82, as seen in FIGS. 8(a) and 8(b), which acts to amplify the polymer's displacement. The cantilever deflection is measured to determine strain as a function of time.

The freestanding polypyrrole film 89 is immersed in a Nylon bath 83 filled with tetraethylammonium hexafluorophosphate in propylene carbonate. At one end, the film is clamped via a clamp 86 between two polyacetal blocks, which in turn are connected to a linear translation stage 84. The linear translation stage 84, seen in FIG. 8(a), allows the initial position to be adjusted. The other end of the film is held by a capstan 85, which includes a 22 mm long M2 stainless screw, into which a slot has been milled along its length. The film 89 is inserted into the slot, and wrapped in three turns around the screw. The capstan 85 is connected via a 0.4 mm diameter stainless steel wire to a cantilever 82, 7.6 mm below the fulcrum. The cantilever 82 is a 183 mm long, 5.75 g stainless steel beam, 168 mm of the length being above the fulcrum. The beam 82 and film 89 together are calculated to have natural resonance frequency of 2.8 Hz. The counterelectrode 88 is positioned near one side of the film 89, with the reference electrodes 81 are positioned on the opposite side of the film 89.

Figure 9:
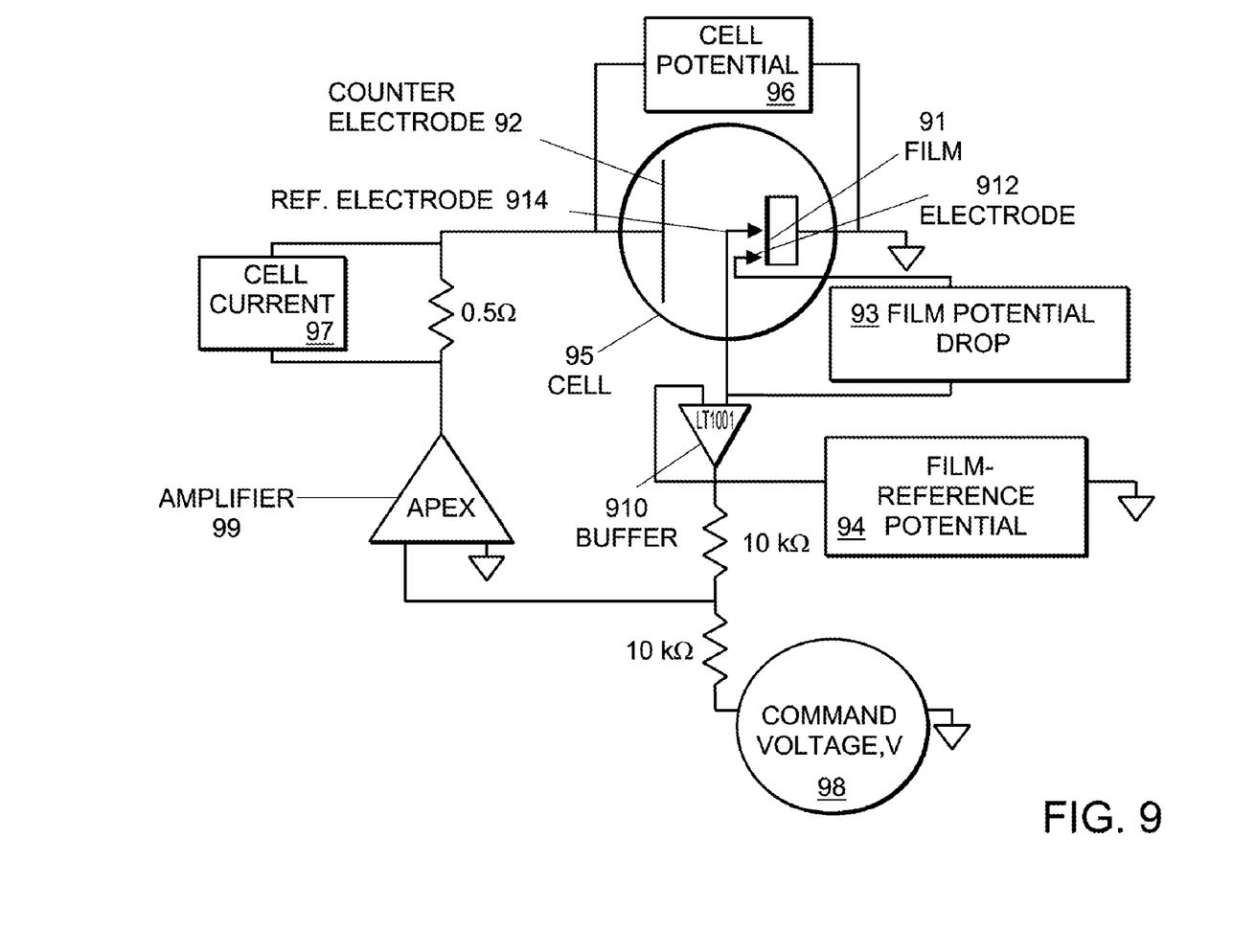
FIG. 9 is a schematic diagram of a circuit employed to drive a linear actuator, in accordance with one embodiment of the invention.

In accordance with one embodiment of the invention, FIG. 9 is an electrical circuit diagram for the linear actuator shown in FIGS. 8(a) and 8(b). Electrical contact to the film 91 is made at both ends. A stainless steel counter electrode 92 sits 5 mm below the film, extending the width of the bath. The reference electrodes 912 and 914 are $Ag/AgClO_4$, as described by J. Courtot-Coupez, M. L'Her, *Bulletin De La Societe Chimique De France* 1970, 4, 1631-1636, which is herein incorporated by reference, in its entirety. One electrode 914 acts as the cell 95 reference for a potentiostat circuit, and is placed several millimeters above the film 91, at the center point between the clamp and the capstan. The voltage drop 93 across the film 91 is roughly determined using a second reference electrode 912, 25 mm from the first.

By use of reference electrode 912 in combination with the potentiostat circuit, the potential drop across the counter electrode 92 may be ignored. Current is typically not applied to the reference electrode 912. The potentiostat circuit typically includes a standard feedback loop that may include, for example, a power operational amplifier 99 and a current buffer 910. The feedback loop is used to maintain the desired potential between the reference electrode 912 and the electrostrictive material 91. Electrolytic resistance between the reference electrode 912 and the electrostrictive material 91 may be estimated, upon a step in the electric potential between the reference electrode 912 and the electrostrictive material 91 caused by a change in current through the electrolyte (since the electrostrictive material is not charged yet), by dividing the electric potential at the reference electrode 912 by the current flowing through the electrolyte. An estimated double layer voltage can then be calculated by subtracting the product of the electrolytic resistance and the current flowing through the electrolyte from the electrical potential across the reference electrode 912 and the electrostrictive material 91. The voltage across the reference electrode 912 and the electrostrictive material 91 may then be adjusted so as to the estimated double layer voltage does not exceed a limiting double layer voltage.

Figure 10A:
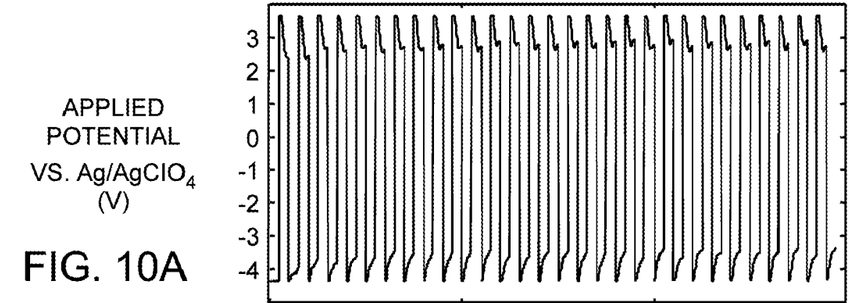
FIG. 10(a) is a plot of potential applied to a polypropyrrole linear actuator versus time, in accordance with one embodiment of the invention.
Figure 10B:
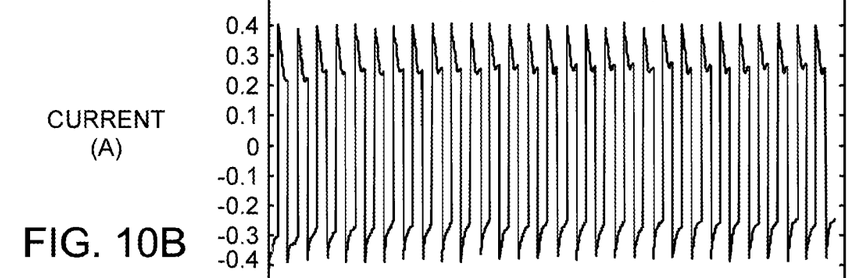
FIG. 10(b) is a plot of resulting current of the polypyrrole linear actuator of FIG. 10(a) versus time, in accordance with one embodiment of the invention.
Figure 10C:
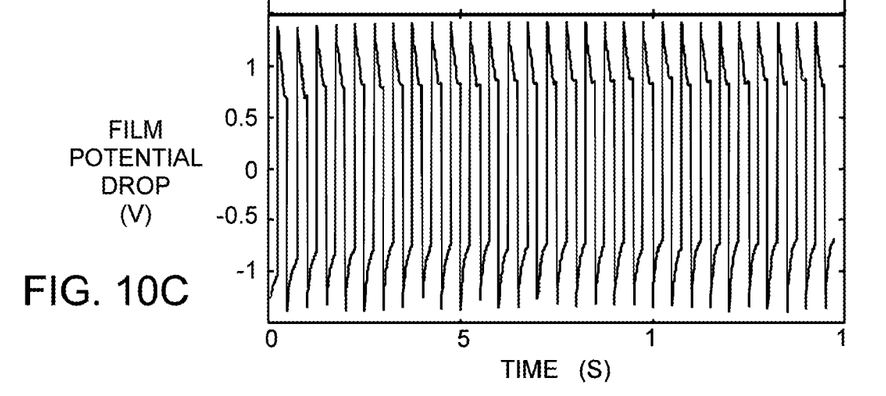
FIG. 10(c) is a plot of film potential drop of the polypyrrole linear actuator of FIG. 10(a) versus time, in accordance with one embodiment of the invention.

The applied potential may be supplied, for example, by a D/A converter 98 under software control via, for example, a data input/output board. The board may also serve to record, by using an A/D converter for example, the cell current 97, cell potential 96, film to reference potential 94 and the film potential drop 93. The magnitude of applied potential, V, the number of cycles, the cycle period, T, and the threshold (limiting) voltage, $V_T$, are all input to the software. At the start of a run, the film to reference potential 94 is increased by V and the resulting current 97 is recorded. As discussed, the current, I, 97 is used to estimate cell resistance, R. The subsequent values of applied potential, V, are then adjusted such that $V=I \cdot R + V_T$ once $V - I \cdot R > V_T$. Voltage is stepped to negative V after time $0.5 \cdot T$, and again the potential is shaped to compensate for the I·R drop. The process is repeated up to the specified number of cycles, during which cell potential 96, current 97, film potential drop 93 and polymer to reference potential 94 are recorded every 10 ms. The shape of the resulting potential profile is seen in FIGS. 10(*a-c*). Note that the resistance, R, is likely overestimated because the interval between samples provides time for some double layer charging to occur.

Cantilever deflections are observed using a digital video camera, with video available from the web at J. D. Madden, P. G. Madden, P. A. Anquetil, 1999. Conducting Polymer Devices (including actuator videos). Web Page, http://Bioinstrumentation.mit.edu/Projects/CP.htm. Strain and strain rate are determined by measuring changes in the beam angle. The power to mass ratio is calculated from the product of the gravitational force and the velocity. The gravitational force on the beam is relatively constant, producing static stresses on the film of between 1.5 and 1.8 MPa, depending on beam angle. Gravitational force dominates until the resonant frequency is approached, at which point energy accumulates over about ten cycles, amplifying strain rates. In determining power to mass near resonance, data is taken from the first cycle, before the stored energy becomes significant.

FIGS. 10 (*a-c*) shows the typical form of the applied potential, and the resulting current and film potential drop. Note that the drop across the film accounts for roughly $\frac{3}{8}^{ths}$ of the total potential difference. The threshold voltage is set at 0.7 V and the magnitude of the applied potential is 4 V. At a 1 Hz frequency the film strain reaches 1.1%, with a peak strain rate of 3.2% s$^{-1}$, and a peak power to mass ratio 39 W·kg$^{-1}$. The strain rate is roughly ten times higher than any previously reported. The power to mass ratio approaches the 50-100 W·kg$^{-1}$ of mammalian skeletal muscle. At 2.5 Hz, near resonance, strain rates reach 9.7%·s$^{-1}$ after ten cycles. 1050 cycles were applied at frequencies ranging from 0.5 to 3 Hz without any observable degradation in response. The applied potential was then raised to 10 V, at which point rapid degradation was observed.

In another embodiment of the invention, feedback from a reference electrode may be utilized without a potentiostat circuit to determine the double layer potential. The reference electrode is placed between the counter electrode and the electrostrictive material. Application of an applied potential across the counter electrode and the electrostrictive material leads to a current. The total counter electrode to electrostrictive material voltage is the sum of the voltage between the electrostrictive material and the reference electrode plus the voltage between the reference electrode and the counter electrode. Measuring the potential difference between the reference electrode and the electrostrictive material fast enough that the double layer is not significantly charged enables the resistance to be estimated. This resistance is simply given by dividing the change in potential across the electrostrictive material and the reference electrode by the current through the electrolyte. The extent of charging of the double layer can subsequently be calculated by subtracting the reference to counter electrode voltage and the product of the current and resistance from the change in applied potential. It is then straightforward to develop a control algorithm to ensure that the double layer potential does not go beyond specified limiting bounds.

The double layer potential can be controlled without using a reference electrode in several ways. If the charge to potential relationships of the two electrodes are known, then the state of charge of the electrodes can be determined without use of a reference electrode. A simple example is when both electrodes are identical electrostrictive materials (as in FIG. 3), and the change in double layer potential is equal in magnitude and opposite in sign. The magnitude of the double layer potentials is then given by the applied potential minus the product of the current and the series resistance. Once again the series resistance can be found by dividing a change in voltage by the induced current a short time after the application of the voltage.

There are many methods of determining the series resistance (often dominated by the electrolyte resistance). For example, a high frequency voltage or current signal can be superimposed on the applied potential, and the resulting current or voltage measured. The resistance is then calculated from the signal and response. The frequency must be sufficiently high that double layer charging is minimal.

In summary, the use of unusually high applied potentials leads to an increase in the strain rate and power to mass achievable from electrochemical actuators of a given thickness. Much of the applied potential is initially across the solution, and not the electrostrictive material/electrolyte interface, explaining why there is no rapid electrostrictive material degradation at short times despite high potentials. As in a typical electrochemical reaction, a change in the applied potential leads to a charging of the double layer between the electrolyte and the electrode. However, this double layer charging is unusually slow. The slow charging time probably results from simultaneous electrostrictive material/electrolyte interface discharging as dopant ion/polymer charge pairs diffuse into the bulk polymer. This explains the seemingly diffusion limited response of bilayer deflection, and is consistent with the behavior of polypyrrole in the pseudo-capacitive regime, as described by C. Arbizzani, M. Mastroagostino, B. Sacrosati, *Handbook of Organic and Conductive Molecules and Polymers*; John Wiley & Sons: Chichester, 1997; Vol. 4, pp 595-619, which is herein incorporated by reference, in its entirety. Higher applied potentials lead to greater charge accumulations at the electrostrictive material/electrolyte interface and hence faster diffusion and strain. Alternatively, the porosity of the electrostrictive material may provide additional surface area, increasing charging time.

Increasing applied potential increases the strain rates in electrochemical actuators. Providing that the potentials are applied over relatively short periods of time, little or no degradation occurs, allowing the actuators to be cycled repetitively. Strain rates on an order of magnitude greater than have been previously reported are achievable, with power to mass ratio nearly equal, in various embodiments, to that of mammalian skeletal muscle. Fast deflections may be observed both in and out of a liquid environment using linear and bilayer actuators. A method of shaping potential similar to I·R compensation is provided in order to reduce degradation at longer times while maintaining fast response.

Although various exemplary embodiments of the invention have been disclosed, it should be apparent to the those skilled in the art that various changes and modifications can be made which will achieve some of the advantages of the inventions without departing from the true scope of the invention. These and other obvious modifications are intended to be covered by the appended claims.

What is claimed is:

1. An actuator device comprising:
   a. an electrolyte;
   b. an electrostrictive material disposed adjacent to the electrolyte;
   c. a counterelectrode electrically coupled to the electrolyte and electrorestrictive material; and
   d. a controller for applying an electrical potential across the electrostrictive material and the electrolyte relative to the counterelectrode, thereby resulting in a double layer potential and a current flowing between the electrostrictive material and the counterelectrode, wherein the controller varies the electrical potential so as to regulate the double layer potential.

2. An actuator device according to claim 1, wherein the controller varies the electrical potential such that the double layer potential does not exceed a specified limiting double layer potential.

3. An actuator device according to claim 2, wherein the controller varies the electrical potential such that the electrical potential is greater than the specified limiting double layer potential.

4. The actuator device according to claim 1, wherein the controller varies the electrical potential so as to obtain a specified double layer potential.

5. The actuator device according to claim 1, wherein the controller includes a current measuring device for measuring the current, whereby the controller calculates a portion of the electrical potential appearing across the electrolyte and counterelectrode, and subtracts the portion of the applied potential to obtain an estimated double layer potential.

6. The actuator device according to claim 5, wherein the controller includes a multiplier for multiplying the current by a substantially constant electrolyte resistance to obtain the portion of the electrical potential appearing across the electrolyte.

7. The actuator device according to claim 1, wherein the electrostrictive material includes polypyrrole.

8. The actuator device according to claim 1, wherein the electrostrictive material includes carbon nanotubes.

9. The actuator device according to claim 1, wherein the electrostrictive material is coupled to a second material to form a bilayered actuator.

10. The actuator according to claim 9, wherein the second material is platinum.

11. The actuator according to claim 9, wherein the second material acts as the counterelectrode.

12. The actuator according to claim 1, wherein the electrolyte is a gel.

13. The actuator according to claim 1, further comprising a reference electrode within the electrolytic solution.

14. The actuator according to claim 13, further including a potentiostat circuit for setting a desired potential between the electrostrictive material and the reference electrode.

15. An actuator device comprising:
    a. a first electrode disposed adjacent to a first layer of electrostrictive material;
    b. an electrolyte disposed adjacent to the first layer;
    c. a second electrode disposed adjacent to a second layer of electrostrictive material; the second layer further disposed adjacent to the electrolyte; and
    d. a controller for applying an electric potential across the first electrode and the second electrode, thereby resulting in a first double layer potential between the first layer and the electrolyte and a second double layer potential between the second layer and the electrolyte, wherein the controller varies the electric potential so as to regulate the first double layer potential and the second double layer potential.

16. The actuator device according to claim 15, wherein the controller varies the electrical potential such that the first double layer potential and the second double layer potential do not exceed a specified limiting double layer potential.

17. The actuator device according to claim 15, wherein the controller varies the electrical potential such that the electric potential is greater than the specified limiting double layer potential.

18. The actuator device according to claim 15 wherein the electrostrictive material includes polypyrrole.

19. The actuator device according to claim 15, wherein the electrostrictive material includes carbon nanotubes.

20. The actuator device according to claim 15, wherein the electrolyte is a gel.

* * * * *